United States Patent [19]

Sivers et al.

[11] 4,207,957

[45] Jun. 17, 1980

[54] DEVICE FOR REDUCTION OF BENDING VIBRATIONS

[75] Inventors: Rolf V. Sivers, Warmbronn; Ulrich Layher, Sersheim, both of Fed. Rep. of Germany

[73] Assignee: Dr. Ing. h.c.F. Porsche Aktiengesellschaft, Stuttgart, Fed. Rep. of Germany

[21] Appl. No.: 952,045

[22] Filed: Oct. 17, 1978

[30] Foreign Application Priority Data

Oct. 21, 1977 [DE] Fed. Rep. of Germany ....... 2747225

[51] Int. Cl.² .............................................. F16F 15/12
[52] U.S. Cl. ..................................... 180/70 P; 74/574
[58] Field of Search ............... 180/70 R, 70 P; 74/574

[56] References Cited

U.S. PATENT DOCUMENTS

| 3,292,389 | 12/1966 | Adloff | 180/70 P |
| 4,077,233 | 3/1978 | Hornig | 74/574 |

Primary Examiner—John P. Silverstrim
Attorney, Agent, or Firm—Craig & Antonelli

[57] ABSTRACT

A device for the reduction of vibration on a rigid supporting pipe disposed longitudinally between an engine and a drive unit and surrounding a drive shaft is formed by connecting the supporting pipe to a suppressing mass through the intermediary of one or more elastic damping elements.

9 Claims, 5 Drawing Figures

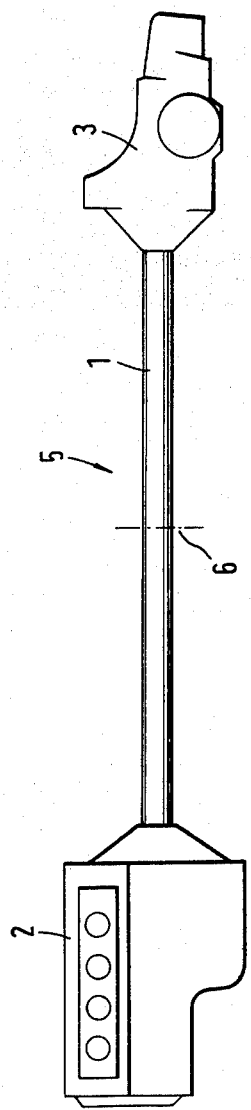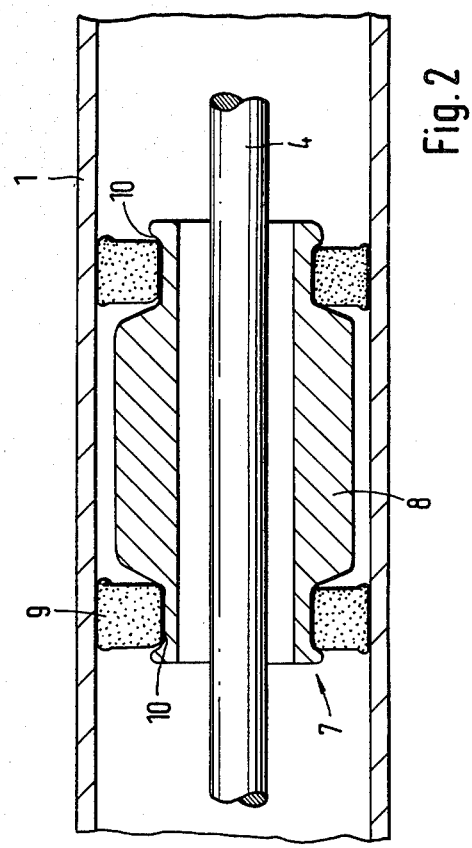

DEVICE FOR REDUCTION OF BENDING VIBRATIONS

BACKGROUND AND SUMMARY OF THE INVENTION

The invention relates to a device for the reduction of bending vibrations on a rigid supporting pipe disposed longitudinally in a vehicle, said pipe being connected with a drive unit at the rear, and with an engine at the front, said engine being in driving connection with the rear drive unit via a drive shaft disposed inside the said supporting pipe.

A device is known [German Auslegeschrift 25 08 212, which corresponds to U.S. Pat. No. 4,077,233] for damping torsional and bending vibrations in the drive system of automobiles which makes use of a vibration suppressor. The vibration suppressor is connected with the driving part of the drive system.

In a vehicle design with an engine disposed in the front of the vehicle and a drive unit at the rear, the engine is connected with the drive unit by means of a rigid supporting pipe, said drive unit being in driving connection with the engine via a drive shaft disposed in the supporting pipe. Such an assembly, also called a transaxle assembly, is subject to vibrations in general, and to bending vibrations in particular, from the free inertial forces of the engine, and particularly, in 4-cylinder engines where inertial forces of the second order, which are in proportion to the rpm of the engine occur and whereby comfort is diminished because of increased noise inside the vehicle, and vibrations.

The invention is intended to develop a device of the mentioned type with which comfort is enhanced by a lowering of the internal noise level and a reduction of vibration by decomposition of the bending vibrations on the transaxle assembly.

The problem is solved according to a preferred embodiment of the invention by a vibration suppressor connected with the supporting pipe, the suppressing mass of the device being fastened to the supporting pipe without contact with the drive shaft, by elastic means, whereby, according to the preferred embodiment of the invention, it is provided that the vibration suppressor is disposed within the supporting pipe in a zone of high vibration (the vibration antinode), and the suppressing mass is braced in the supporting pipe by means of elastic rings. The elastic rings are made of an elastic material, especially elastomer, or a technically equivalent material.

According to another aspect of the invention, it is provided that the suppressing mass has the configuration of a sleeve and presents receivers at its ends, for the elastic rings.

According to yet another feature of the invention, the suppressing mass of the vibration suppressor is arcuate, bears on an elastic element fixed in the supporting pipe, and is disposed without contact between the supporting pipe and the drive shaft.

According to another preferred embodiment of the invention, a vibration damping device is disposed outside of the supporting pipe and the suppressing mass is connected therewith by an elastic element. The elastic element in this case is vulcanized onto supporting plates that are connected on one side with the supporting pipe and on the other with the suppressing mass, via fastening means. In a special arrangement of the vibration suppressor on the vehicle, the damping device is disposed between the supporting pipe and an upstream muffler for an exhaust line, the device being arcuate in configuration and partly surrounding the said upstream muffler, at a distance.

Among the advantages that the invention offers is the fact that passenger comfort is increased by reduction of the vibrations on the assembly. This reduction is made possible by a decomposition of bending vibrations on the supporting pipe that are typical of the assembly by means of the vibration suppressor. The suppressor is disposed inside or outside the supporting pipe, in a simple construction. The vibration may also be made as a part which can be installed subsequently on the supporting pipe. By use of strongly damping elastomers and special volume selection of the elastomer, there can also be a general reduction of vibration on the supporting pipe, by dynamic coupling of the suppressing mass.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a side view of a forward engine and a rear drive unit, connected by a supporting pipe;

FIG. 2 is a longitudinal section through the supporting pipe, with a first preferred embodiment of the vibration suppressor according to the invention shown in position inside it;

DETAILED DESCRIPTION OF THE PREFERRED EMBODIMENTS

Figure 3:
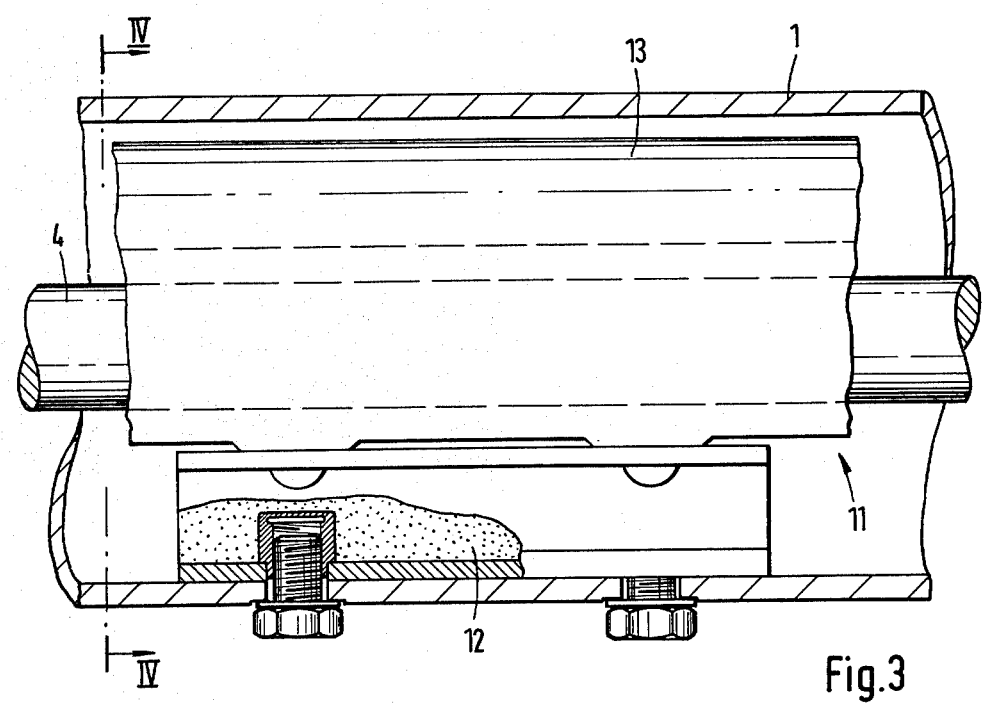
FIG. 3 is another form of preferred embodiment of a vibration suppressor disposed inside the pipe.

As FIG. 1 shows, supporting pipe 1 produces a "rigid" connection between engine 2 disposed at the front of the vehicle, especially an internal combustion engine, and a drive unit 3, disposed in the rear of the vehicle. Drive unit 3 includes a transmission and a direct drive. Combustion engine 2 is in driving connection with the rear drive unit 3 via a drive shaft 4 disposed inside supporting pipe 1. This assembly, called the transaxle assembly 5, is borne on the vehicle frame by bearings that are not shown in detail. Drive shaft 4 is borne in supporting pipe 1 via intermediate bearings, so disposed that bending resonances of the shaft are avoided.

Supporting pipe 1 is provided with one or more vibration suppressors. The said suppressors can be disposed inside or outside supporting pipe 1. The suppressor is in, or at least near, a vibration antinode of the bending vibration. This vibration antinode in the illustrated transaxle assembly 5 is about in the middle of the supporting pipe, at 6, but it could be nearer the engine or nearer the drive unit in an otherwise designed assembly.

As FIG. 2 shows in more detail, vibration suppressor 7 encloses a suppressing mass 8 which is braced via elastic elements 9 in supporting pipe 1, without contact with drive shaft 4 and supporting pipe 1. The suppressing mass 8 presents the configuration of a sleeve, provided at its ends with receivers 10 for the elastic elements 9. Elastic elements 9 are made as rings, and advantageously consist of a butyl material (elastomer). This suppressor 7 inside the pipe is pressed, like a shaft guide bearing, into supporting pipe 1, and placed at the spot of maximum levels of vibration, which can be determined empirically and by computation. Rings 9 and the cylindrical suppressing mass 8 have the effect that, in an advantageous way, there is a uniform suppression resonance frequency in all directions. Thus, the size of the suppressing mass, and the size and resilient properties of the elastic element must be determined for each particular case and these properties must be balanced so as to provide a system which will adequately damp vibrations that are produced, while limiting the amplitude of movement of the suppressing mass so as to preclude contact of the suppressing mass with either the supporting pipe 1 or either the drive shaft 4 or the muffler 21, in the FIG. 1-4 and FIG. 5 embodiments, respectively.

Figure 4:
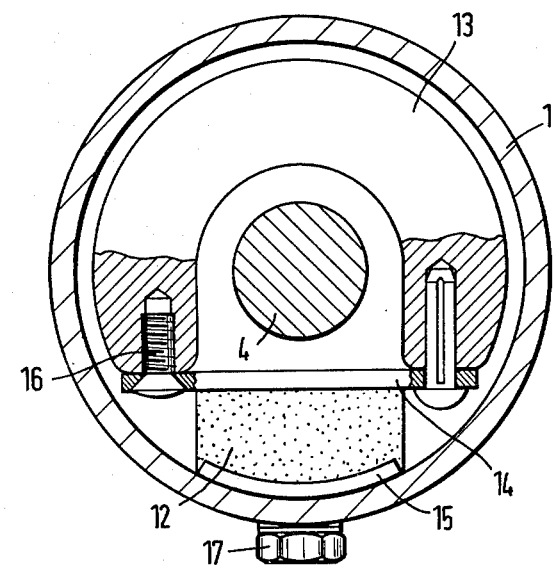
FIG. 4 is a section along line IV—IV of FIG. 4.

According to another embodiment, FIGS. 3 and 4, a vibration suppressor 11 is disposed inside supporting pipe 1 and only fastened in the pipe 1 via an elastic body 12. Suppressing mass 13 is horseshoe-shaped, whereby the free ends are united with supporting pipe 1 by elastic body 12.

Suppressing mass 13 extends around drive shaft 4 without contacting it. Elastic body 12 also is made of a rubber material, especially a butyl material. Supporting plates 14, 15 are vulcanized onto elastic body 12, for fastening to suppressing mass 13 and also to supporting pipe 1, respectively. There are fastening bolts 16, 16' in the plate 14 and 17 in the plate 15. While two different bolts 16, 16' are shown in the drawings for exemplary purposes, all of the bolts may be threaded as shown for bolt 16, or splined or notched bolts or pins as at 16'. Depending upon the length of suppressing mass 13, elastic body 12 extends correspondingly in the longitudinal direction of the supporting pipe 1.

Figure 5:
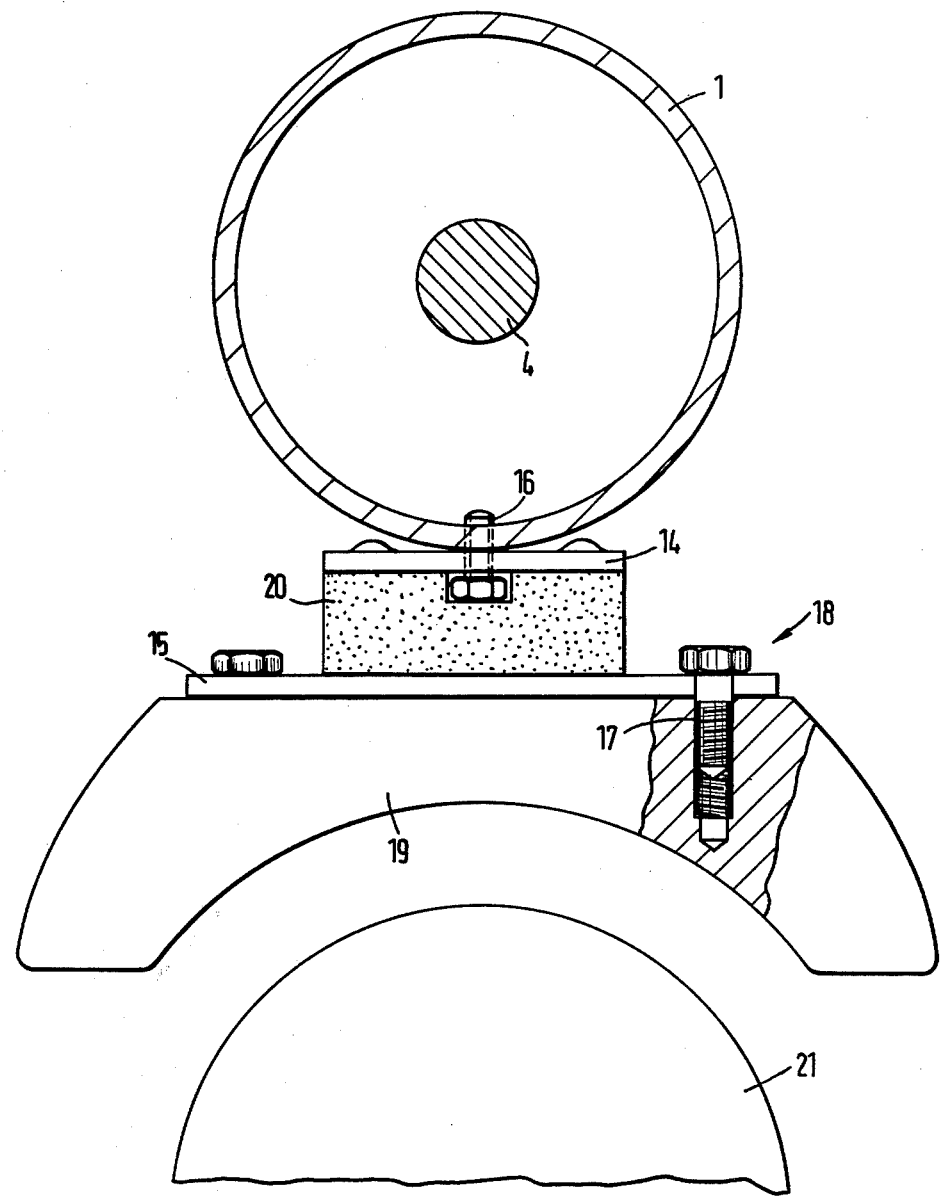
FIG. 5 is an embodiment with an external vibration suppressor, shown in cross section.

In another preferred embodiment shown in FIG. 5, an external vibration suppressor 18 is made as a part that can be installed or incorporated into an existing vehicle by an owner seeking to suppress vibration noise. Suppressing mass 19 of this suppressor 18 is connected with supporting pipe 1, as in the case of the internally disposed suppressors 7 and 11, with intermediate introduction of a rubber elastic body 20. In consideration of an upstream muffler 21 for an exhaust line disposed under the supporting pipe, suppressing mass 19 is made arcuate and partly surrounds the said muffler 21.

The vibration suppressors present the same resonance frequency in the vertical as in the transverse direction, whereby vibrations of the transaxle assembly are also decreased in the transverse direction. In addition the vibration damping device also acts as a torsion vibration damper. Tuning of the suppressor is controlled by the mass, the hardness of the elastomer, and the configuration of the elastic elements.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A vibration suppressing device for the reduction of bending vibrations on a rigid supporting pipe disposed in the longitudinal direction of a vehicle, which supporting pipe is connected with a drive unit at the rear of the vehicle and an engine at the front, said engine being in driving connection with the rear drive unit via a drive shaft, said drive shaft being positioned inside the said supporting pipe, said device comprising a vibration suppressing mass, elastic means for attaching said suppressing mass to said supporting pipe without contact with the drive shaft.

2. A device according to claim 1, wherein the vibration suppressing mass is disposed inside the supporting pipe in a region that normally experiences a high level of vibration, and wherein the elastic means are formed by elastic rings which brace the suppressing mass in the supporting pipe.

3. A device according to claim 2, wherein said suppressing mass is located at a vibration antinode.

4. A device according to claim 2, characterized in that the elastic rings are made of an elastic material from the elastomer group.

5. A device according to claims 2 or 4, characterized in that the suppressing mass is formed in the configuration of a sleeve, and has receivers at its ends for the elastic rings.

6. A device according to claim 1, wherein said elastic means comprises an elastic element fixed in the supporting pipe, and characterized in that the suppressing mass is arcuate in configuration, bears on said elastic element fixed in the supporting pipe and is disposed without contact between the supporting pipe and the drive shaft.

7. A device as in claim 1, characterized in that the vibration suppressing mass is disposed outside the supporting pipe and the suppressing mass is connected with the supporting pipe by an elastic element forming said elastic means.

8. A device as in claims 6 or 7, characterized in that the elastic means comprises supporting plates vulcanized to opposite sides of the elastic element, one of said plates being connected with the supporting pipe and another of said plates being connected with the suppressing mass by fastening means.

9. A device as in claims 1 or 7, characterized in that the vibration suppressing mass is disposed between the supporting pipe and an upstream damping muffler of an exhaust line, and is arcuate in configuration, said arcuate configuration partly enclosing the upstream damping muffler.

* * * * *